(12) United States Patent
Hiruma

(10) Patent No.: US 10,933,672 B2
(45) Date of Patent: Mar. 2, 2021

(54) MOTOR UNIT AND PRINTING APPARATUS

(71) Applicant: SEIKO EPSON CORPORATION, Tokyo (JP)

(72) Inventor: Daisuke Hiruma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/422,474

(22) Filed: May 24, 2019

(65) Prior Publication Data

US 2019/0358977 A1 Nov. 28, 2019

(30) Foreign Application Priority Data

May 28, 2018 (JP) .............................. JP2018-101248

(51) Int. Cl.
| | | |
|---|---|---|
| *G01M 1/16* | (2006.01) | |
| *B41J 29/38* | (2006.01) | |
| *G01B 11/27* | (2006.01) | |
| *H02N 2/02* | (2006.01) | |
| *H02K 11/22* | (2016.01) | |
| *B41J 19/20* | (2006.01) | |
| *G03G 15/00* | (2006.01) | |
| *B41J 11/00* | (2006.01) | |

(52) U.S. Cl.
CPC ............ *B41J 29/38* (2013.01); *B41J 11/008* (2013.01); *B41J 19/202* (2013.01); *G01B 11/272* (2013.01); *G03G 15/757* (2013.01); *H02K 11/22* (2016.01); *H02N 2/02* (2013.01)

(58) Field of Classification Search
CPC .................................. G01M 1/16; G01B 7/16
See application file for complete search history.

(56) References Cited

U.S. PATENT DOCUMENTS

| | | | | |
|---|---|---|---|---|
| 4,080,609 | A * | 3/1978 | Garge | ...................... B41M 5/20 346/139 C |
| 7,248,819 | B2 * | 7/2007 | Jeon | ..................... G03G 15/757 399/159 |
| 2015/0177195 | A1 * | 6/2015 | Sasaki | .................... G01N 29/12 73/579 |
| 2016/0341548 | A1 | 11/2016 | Lee et al. | |
| 2017/0261395 | A1 * | 9/2017 | Lee | ......................... G01M 1/16 |

FOREIGN PATENT DOCUMENTS

JP          2016217839          12/2016

* cited by examiner

*Primary Examiner* — Lam S Nguyen
(74) *Attorney, Agent, or Firm* — Workman Nydegger

(57) ABSTRACT

A motor unit includes a motor including a motor side output shaft extending in a Z direction, and a reduction drive, wherein the reduction drive includes a housing, a reduction drive side output shaft extending in the Z direction, a toothed gear group configured to transmit rotation of the motor side output shaft to the reduction drive side output shaft with the rotation being decelerated, and a deformation sensor configured to detect deformation occurring due to vibration of the motor.

6 Claims, 8 Drawing Sheets

000
MOTOR UNIT AND PRINTING APPARATUS

The present application is based on and claims priority from JP Application Serial Number 2018-101248, filed May 28, 2018, the disclosure of which is hereby incorporated by reference herein in its entirety.

BACKGROUND

1. Technical Field

The present disclosure relates to a motor unit, and a printing apparatus including the motor unit.

2. Related Art

A sliding member (e.g., bearing) among members constituting a driver (motor) is likely to deteriorate due to abrasion. When the sliding member deteriorates, a phenomenon in which a shaft center of an output shaft of a motor deflects from a reference axis (center runout), or a phenomenon in which a shaft center of an output shaft of a motor inclines with respect to a reference axis (surface runout) occurs, and power of the motor is no longer appropriately transmitted to a driven body. Thus, the driven body no longer operates normally, and a defect occurs in an apparatus (e.g., printing apparatus) having the driver and the driven body.

For example, JP-A-2016-217839 proposes a shaft accuracy measuring device for detecting center runout or surface runout of an output shaft of a motor by an optical method. In the shaft accuracy measuring device, the output shaft of the motor is disposed between a light-projecting unit configured to project measurement light and a light receiving unit configured to receive the measurement light. The shaft accuracy measuring device measures the center runout or the surface runout of the output shaft of the motor from a measurement result in the light-receiving unit, and evaluates a state of the output shaft of the motor. Accordingly, by using the shaft accuracy measuring device described in JP-A-2016-217839, a state of the output shaft of the motor can be evaluated, and a state of a sliding member of the motor can be evaluated.

However, in JP-A-2016-217839, the motor is set in the shaft accuracy measuring device to evaluate the state of the output shaft of the motor, and thus, for example, when a state of an output shaft of a motor is evaluated in an apparatus including a motor and a driven body, it is necessary to remove the motor from the apparatus. Accordingly, in JP-A-2016-217839, there is a problem that in a state in which the apparatus is operated, it is difficult to evaluate the state of the output shaft of the motor.

There is also a problem that, even if the shaft accuracy measuring device can be mounted on an apparatus including a motor and a driven body, a new space is required for mounting a light-projecting unit and a light-receiving unit, and thus the apparatus including the motor and the driven body increases in size, and space saving is made difficult.

SUMMARY

A motor unit according to the present application is a motor unit including a motor that includes a motor side output shaft extending in a first direction, and a reduction drive, wherein the reduction drive includes a housing, a reduction drive side output shaft, a toothed gear group configured to transmit rotation of the motor side output shaft to the reduction drive side output shaft with the rotation being decelerated, and a deformation sensor configured to detect deformation occurring due to vibration of the motor.

In a motor unit according to the present application, the deformation sensor may be mounted on a support plate that elastically deforms in a direction intersecting with the first direction.

In a motor unit according to the present application, the support plate may be a cantilever including a fixed portion fixed to the housing, and a deforming portion that elastically deforms due to the vibration and that is mounted with the deformation sensor.

In a motor unit according to the present application, the support plate may be a double fixed beam including two fixed portions fixed to the housing, and a deforming portion that is disposed between the two fixed portions, that elastically deforms due to the vibration, and that is mounted with the deformation sensor.

In a motor unit according to the present application, the deformation sensor may be mounted on the housing.

In a motor unit according to the present application, the deformation sensor may be a load cell in which resistance varies according to the deformation, or a piezoelectric element configured to generate a voltage according to the deformation.

A printing apparatus according to the present application includes the above-described motor unit.

DESCRIPTION OF EXEMPLARY EMBODIMENTS

Exemplary embodiments of the present disclosure are described below with reference to the accompanying drawings. The exemplary embodiments each illustrate an aspect of the present disclosure, and do not limit the present disclosure in any way. The exemplary embodiments can be changed as desired without departing from the scope of the technical concept of the present disclosure. Moreover, in each of the following figures, to make each layer, and each portion recognizable in terms of size, each layer and portion is illustrated at a scale different from an actual scale.

Exemplary Embodiment 1

Overview of Printing Apparatus

Figure 1:
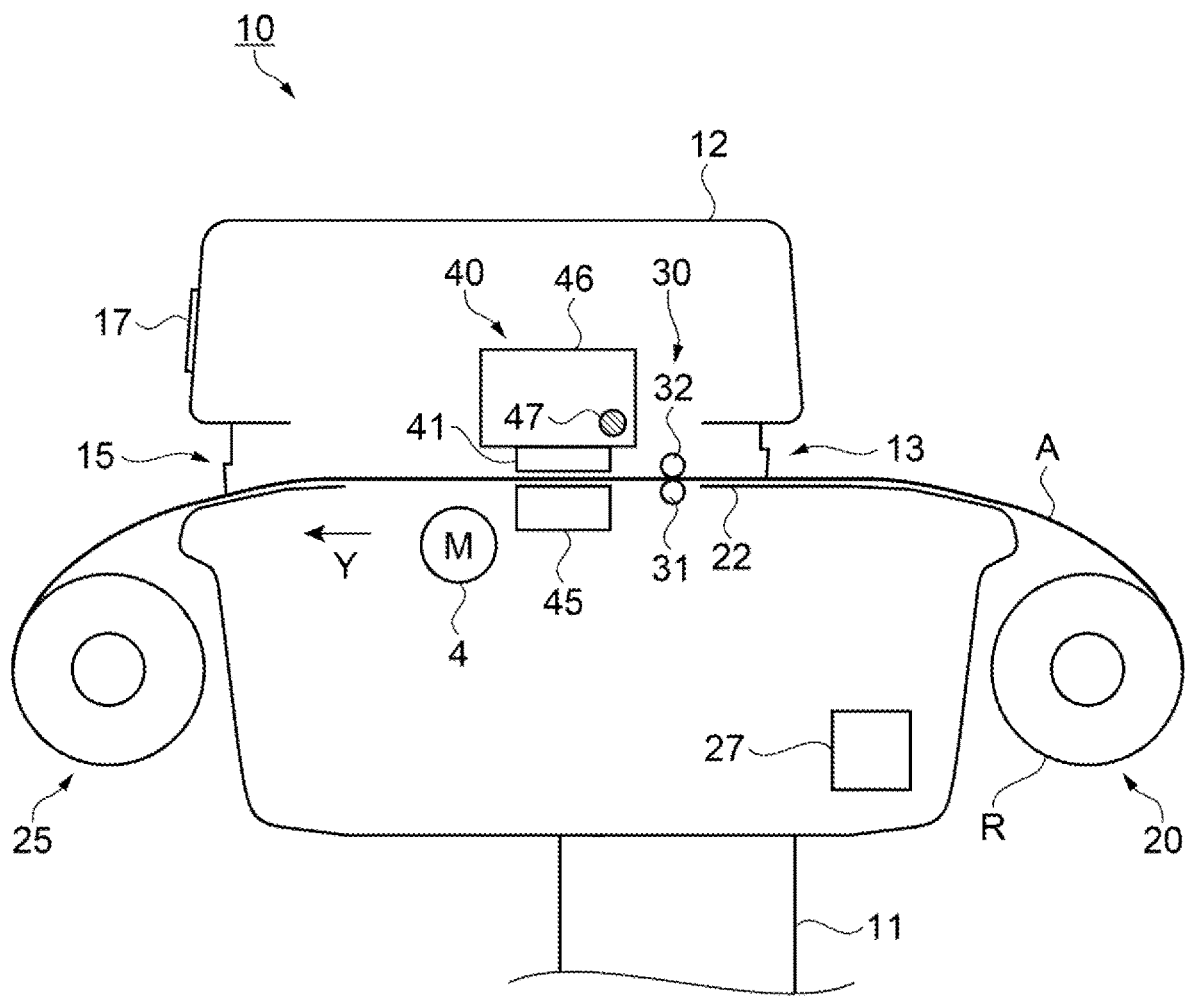
FIG. 1 is a schematic cross-sectional view illustrating a configuration of a printing apparatus according to Exemplary Embodiment 1.
Figure 1:
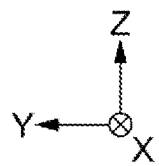

FIG. 1 is a schematic cross-sectional view illustrating a configuration of a printing apparatus according to Exemplary Embodiment 1.

First of all, an overview of a printing apparatus 10 according to the present exemplary embodiment is described with reference to FIG. 1.

As illustrated in FIG. 1, the printing apparatus 10 according to the present exemplary embodiment is a large format printer (LFP) for handling an elongated medium A. The printing apparatus 10 includes a leg portion 11, a housing unit 12 supported by the leg portion 11, a set unit 20 mounted on one end of the housing unit 12 and a winding unit 25 mounted on the other end of the housing unit 12, and a display unit 17 mounted on one end of the housing unit 12. Woodfree paper, cast coated paper, art paper, coat paper, synthetic paper, a film formed of polyethylene terephthalate (PET), polypropylene (PP) or the like, and the like can be used as the medium A, for example.

In the following description, a height direction of the printing apparatus 10 is referred to as a Z direction, a width direction of the medium A is referred to as an X direction, and a direction intersecting with the Z direction and the X direction is referred to as a Y direction. Further, a leading-end side of an arrow indicating the direction is defined as a (+) direction, and a base-end side of the arrow indicating the direction is defined as a (−) direction. Additionally, the Y direction is a direction in which the medium A is transported, and is referred to as a transport direction Y in some cases.

Note that, the Z direction is a vertical direction, and is an example of a "first direction". Additionally, an XY plane is a horizontal plane.

In an inside of the housing unit 12, a transport unit 30 configured to transport the medium A in the transport direction Y, a printing unit 40 (motor unit 4), a control unit 27 configured to control each unit of the printing apparatus 10, and a medium support section 22 are provided. In other words, the printing apparatus 10 according to the present exemplary embodiment includes the transport unit 30, the printing unit 40 (motor unit 4), the control unit 27, and the medium support section 22.

The medium A unwound from a roll body R contained in the set unit 20 is fed inside the housing unit 12 from a feeding port 13. Further, the medium A fed from the set unit 20 is supported by the medium support section 22, and guided to the transport unit 30. The medium A guided to the transport unit 30 is transported toward the printing unit 40 by the transport unit 30. The medium A, after printed in the printing unit 40, is discharged outside the housing unit 12 from a discharging port 15, and wound as a roll by the winding unit 25.

Note that, the medium A may be cut form paper, instead of roll paper.

The transport unit 30 is disposed upstream the printing unit 40 in the transport direction Y, and includes a driving roller 31 and a driven roller 32. The driven roller 32 is pressed against the driving roller 31 via the medium A and is driven and rotated. The driving roller 31 pinches the medium A together with the driven roller 32. In the transport unit 30, the driving roller 31 is rotationally driven by a motor unit (not illustrated), so that the medium A is transported in the transport direction Y.

The display unit 17 is configured with a liquid crystal display device including a touch panel, for example. An operator can perform various settings of the printing apparatus 10 with a touch panel of the display unit 17.

The printing unit 40 includes a printing head 41, a carriage 46 holding the printing head 41, a platen 45 supporting the medium A, a guide shaft 47 supporting the carriage 46, and the motor unit 4 (a motor 6 (see FIG. 2)).

The motor unit 4 drives a belt mechanism (not illustrated) to move the carriage 46 in a main scanning direction along the guide shaft 47.

The printing head 41 includes a pressure generation chamber (not illustrated), a piezoelectric element (not illustrated), and a nozzle (not illustrated). The piezoelectric element is a piezoelectric actuator in a flexural vibration mode, or a piezoelectric actuator in a longitudinal vibration mode. The piezoelectric element vibrates a vibration plate forming part of the pressure generation chamber, to vary pressure in the pressure generation chamber, and by utilizing this pressure variation, ink is discharged from the nozzle onto the medium A. The printing head 41 is held by the carriage 46, and moved by power of the motor unit 4, together with the carriage 46, in the X direction, or an opposite direction to the X direction (hereinafter, referred to as a main scanning direction X).

The platen 45 includes an upper surface that is substantially rectangular and that faces the printing head 41. A longitudinal direction of the upper surface is the width direction of the medium A (X direction). The medium A is suctioned and supported on the upper surface of the platen 45 by a negative pressure applied to the platen 45. This prevents deterioration in recording quality due to lifting of the medium A.

In the printing apparatus 10, by alternately repeating main scanning in which the printing head 41 discharges ink onto the medium A while moving in the main scanning direction X, and sub scanning in which the transport unit 30 transports the medium A in the transport direction Y, an image containing characters, figures, or the like is printed on the medium A.

Note that, the motor unit 4 (motor 6) is a power source for moving the printing head 41 (carriage 46) in the main scanning direction X. The motor unit 4 (motor 6) is intermittently driven, operated during the main scanning, and stopped during the sub scanning. Further, a motor unit of the transport unit 30 is a power source for transporting the medium A in the transport direction Y. The motor unit of the transport unit 30 is intermittently driven, operated during the sub scanning, and stopped during the main scanning.

Overview of Motor Unit

Figure 2:
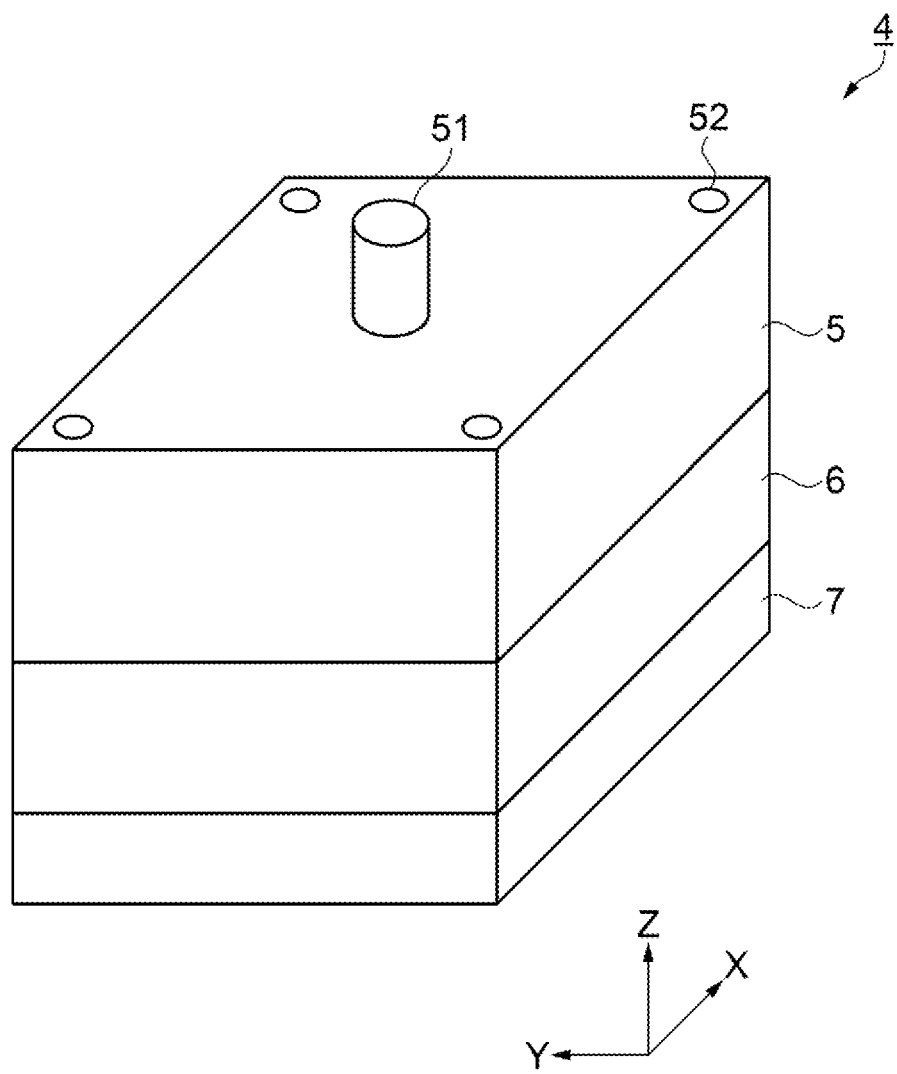
FIG. 2 is a schematic view illustrating a configuration of a motor unit according to Exemplary Embodiment 1.
Figure 3:
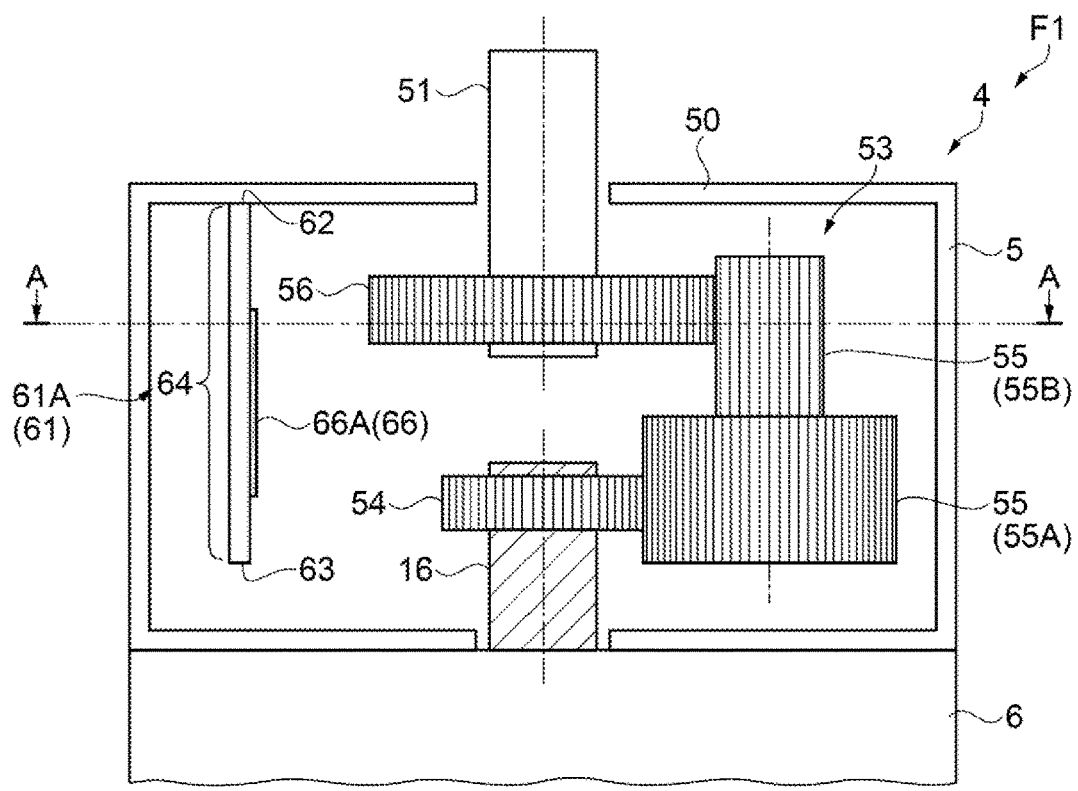
FIG. 3 is a schematic cross-sectional view of a reduction drive.
Figure 3:
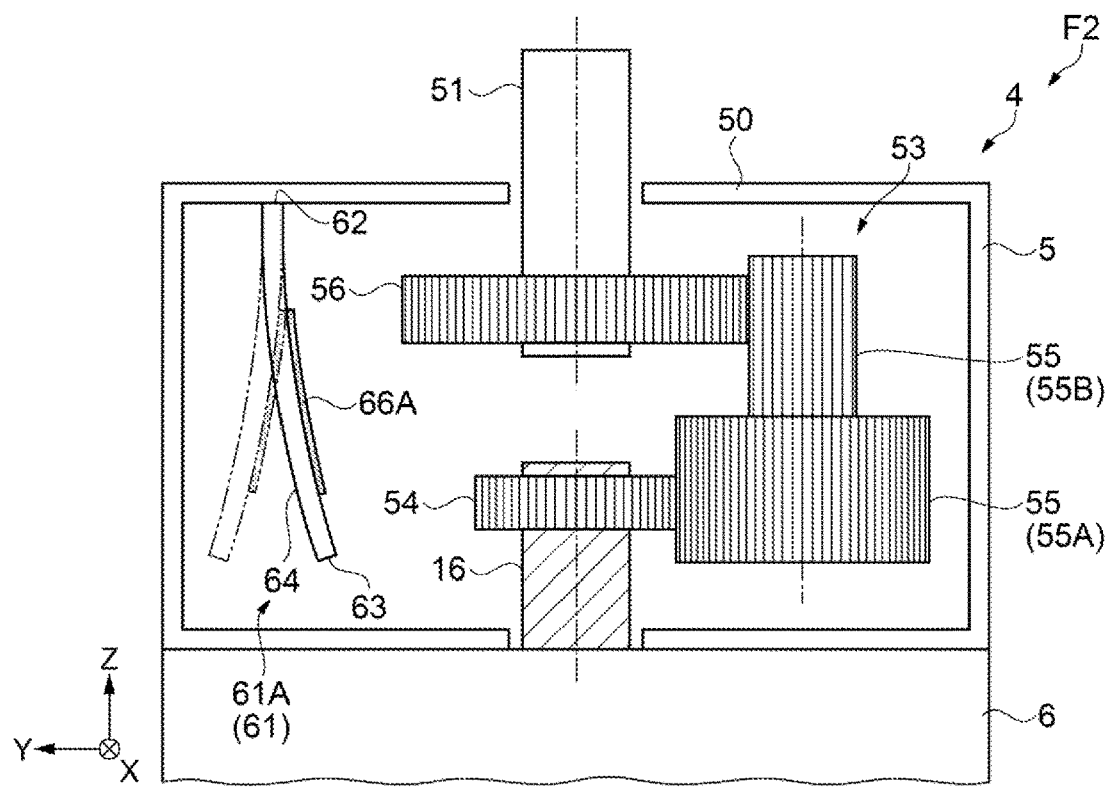
Figure 4:
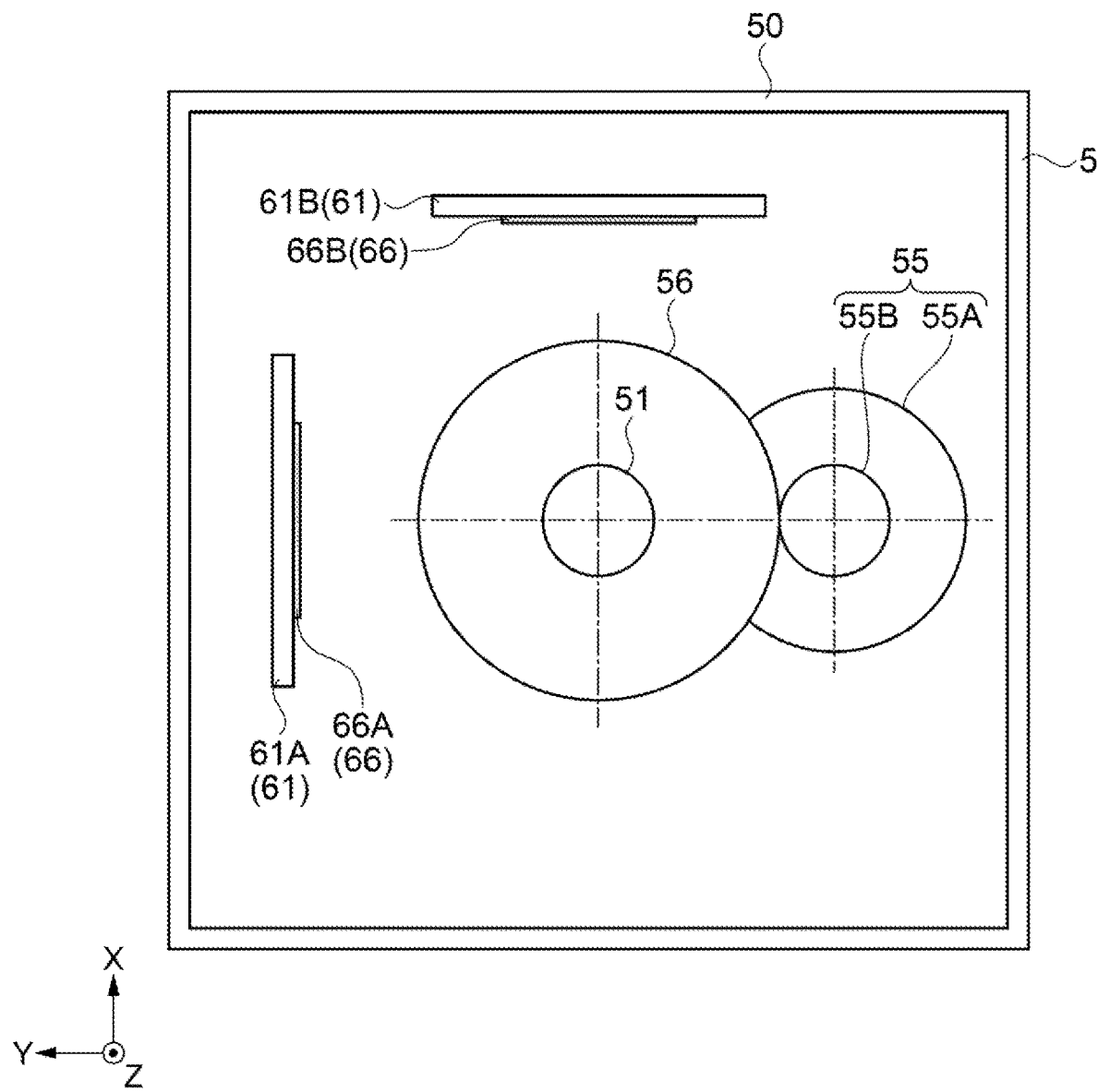
FIG. 4 is a schematic plan view of a motor unit taken along a line A-A in FIG. 3.
Figure 5:
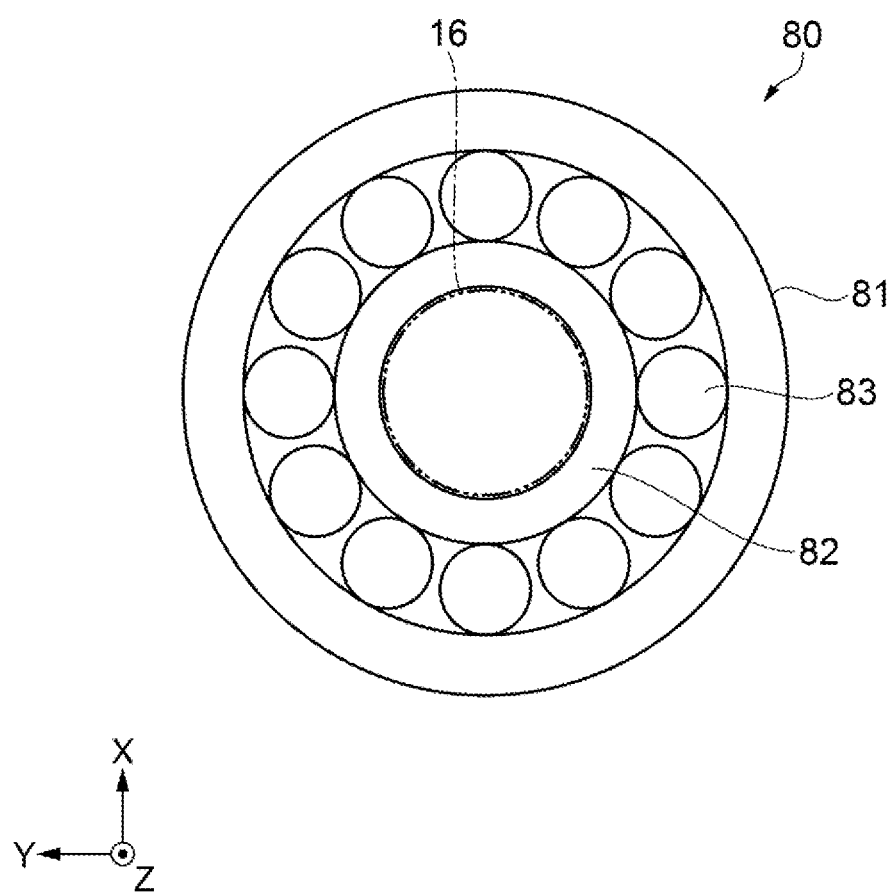
FIG. 5 is a schematic view of a bearing.
Figure 6:
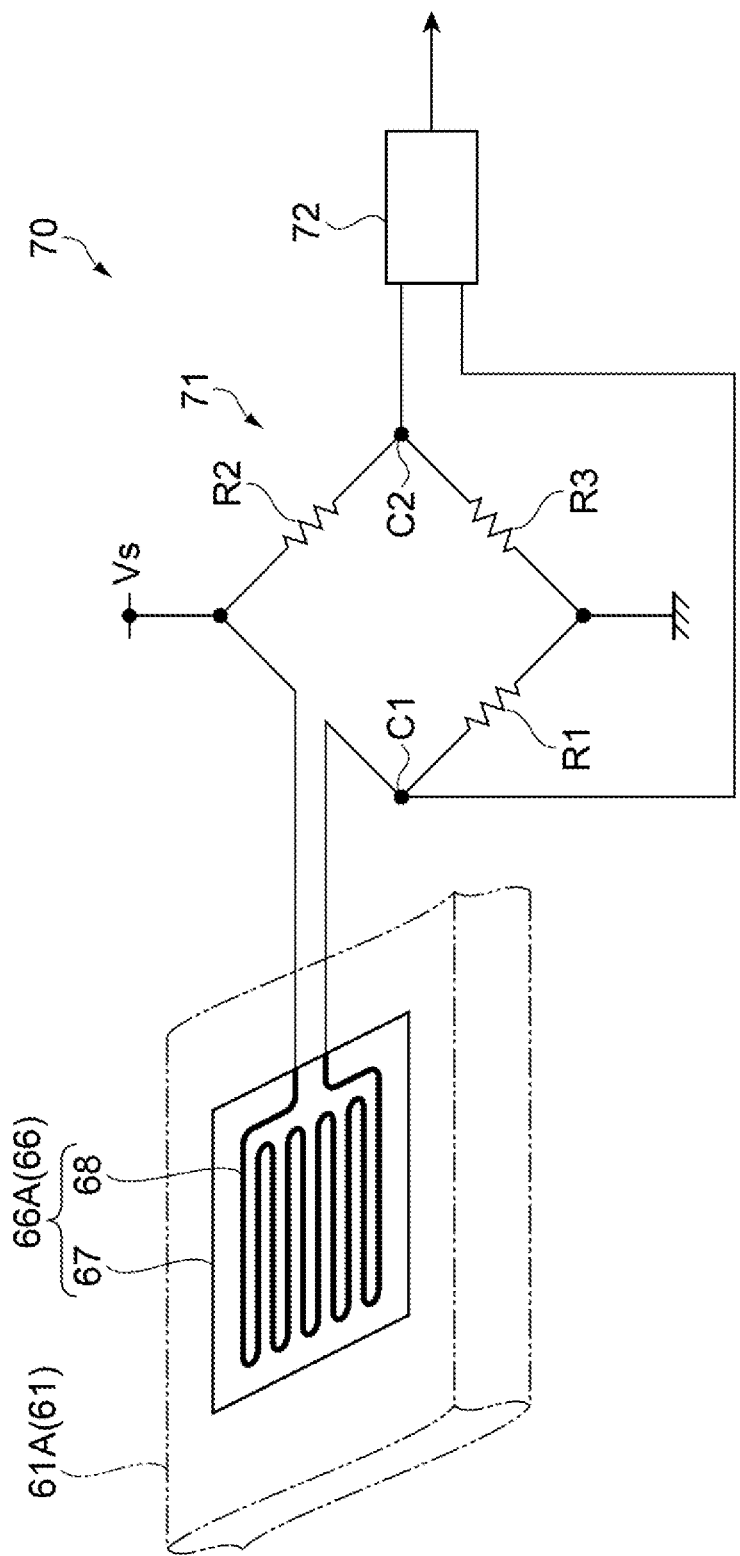
FIG. 6 is a block diagram of a detector for detecting a signal of a deformation sensor.

FIG. 2 is a schematic view illustrating a configuration of the motor unit according to the present exemplary embodiment. FIG. 3 is a schematic cross-sectional view of a reduction drive. FIG. 4 is a schematic plan view of the motor unit taken along the line A-A in FIG. 3. FIG. 5 is a schematic view of a bearing. FIG. 6 is a block diagram of a detector for detecting a signal of a deformation sensor.

Additionally, a diagram indicated by a sign F1 in FIG. 3 is a schematic cross-sectional view of a reduction drive 5 when the motor 6 is not driven, and a diagram denoted by a sign F2 in FIG. 3 is a schematic cross-sectional view of the reduction drive 5 when the motor 6 is driven.

Next, an overview of the motor unit 4 according to the present exemplary embodiment is described with reference to FIGS. 2 to 6.

As illustrated in FIG. 2, the motor unit 4 includes the reduction drive 5, the motor 6, and an encoder 7. The reduction drive 5 is disposed on a side of a Z(+) direction with respect to the motor 6. The reduction drive 5 is fixed to the motor 6, and is removable from the motor 6. The encoder 7 is disposed on a side of a Z(−) direction with respect to the motor 6. The encoder 7 is fixed to the motor 6, and it is difficult to remove the encoder 7 from the motor 6.

In the motor unit 4, a reduction drive side output shaft 51 protrudes from the reduction drive 5 in the Z(+) direction. Further, a surface on the side of the Z(+) direction of the reduction drive 5 is provided with screw holes 52 at four corners, and thus can be fixed to another member with screws.

Note that, although not illustrated, the motor unit of the transport unit 30 has an identical configuration to that of the motor unit 4, and includes a reduction drive, a motor, and an encoder.

The encoder 7 includes a light-emitting unit (not illustrated), a light-receiving unit (not illustrated), and a disk (not illustrated). On the disk, slits disposed at equal angular intervals with respect to a center of the disk are formed. That is, on the disk, the slits and light-shielding sections are disposed at equal angular intervals with respect to the center of the disk. When the disk rotates, light emitted from the light-emitting unit passes through the slits and enters into the light-receiving unit at certain timing, and at next timing, is shielded by the light-shielding sections and does not enter into the light-receiving unit. As a result, an encoder pulse signal is outputted from the light-receiving unit.

The control unit 27 counts the number of pulses of the encoder pulse signals to calculate a rotation angle and a rotational location of a rotor (not illustrated) of the motor 6.

As illustrated in FIG. 3, the motor 6 includes a motor side output shaft 16 extending in the Z direction. The motor side output shaft 16 of the motor 6, in a state of not contacting a housing 50 of the reduction drive 5, is inserted into the housing 50.

As illustrated in FIG. 3 and FIG. 4, the reduction drive 5 includes the housing 50, the reduction drive side output shaft 51 extending in the Z direction, a toothed gear group 53 configured to decelerate rotation of the motor side output shaft 16 and transmit the rotation to the reduction drive side output shaft 51, a first support plate 61A, a first deformation sensor 66A mounted on the first support plate 61A, a second support plate 61B (not illustrated in FIG. 3), a second deformation sensor 66B mounted on the second support plate 61B (not illustrated in FIG. 3), and a detector 70 (see FIG. 6).

When the reduction drive 5 is viewed from the side of the Z(+) direction, that is, in FIG. 4, the first support plate 61A and the first deformation sensor 66A are provided close to a surface on a side of a Y(+) direction of the housing 50 of the reduction drive 5, and the second support plate 61B and the second deformation sensor 66B are provided close to a surface on a side of an X(+) direction of the housing 50 of the reduction drive 5. Support plates 61 (the first support plate 61A, the second support plate 61B), and deformation sensors 66 (the first deformation sensor 66A, the second deformation sensor 66B) are provided on an empty space in the housing 50, thus new spaces are not required for providing the support plates 61 and the deformation sensors 66, and saving space of the printing apparatus 10 is hardly hindered.

Although details will be described later, each of the deformation sensors 66 (first deformation sensor 66A, second deformation sensor 66B) is a load cell in which resistance varies due to deformation, and detects deformation occurring due to vibration of the motor 6. In other words, the reduction drive 5 includes the deformation sensors 66 (first deformation sensor 66A, second deformation sensor 66B) for detecting the deformation occurring due to the vibration of the motor 6.

The toothed gear group 53 includes a toothed gear 54 mounted on the motor side output shaft 16, a toothed gear 56 mounted on the reduction drive side output shaft 51, and a two-stage toothed gear 55 disposed between the toothed gear 54 and the toothed gear 56. The two-stage toothed gear 55 includes a lower side toothed gear 55A disposed at the side of the Z(−) direction and engaging with the toothed gear 54, and an upper side toothed gear 55B disposed at the side of the Z(+) direction and engaging with the toothed gear 56.

Further, the number of teeth of the toothed gear 54 is smaller than the number of teeth of the lower side toothed gear 55A in the two-stage toothed gear 55, and the number of teeth of the toothed gear 56 is larger than the number of teeth of the upper side toothed gear 55B in the two-stage toothed gear 55. In other words, the respective numbers of teeth of the upper side toothed gear 55B, the toothed gear 54, the lower side toothed gear 55A, and the toothed gear 56 ascend in this order.

With this configuration, rotation of the motor side output shaft 16 is decelerated and transmitted to the reduction drive side output shaft 51, via the toothed gear 54, the two-stage toothed gear 55 (lower side toothed gear 55A, upper side toothed gear 55B), and the toothed gear 56. As a result, rotational speed of the reduction drive side output shaft 51 is made slower than rotational speed of the motor side output shaft 16, and torque (driving power) of the reduction drive side output shaft 51 is made higher than torque of the motor side output shaft 16.

In FIG. 3, the first support plate 61A and the first deformation sensor 66A are illustrated, and the second support plate 61B and the second deformation sensor 66B are not illustrated. Further, FIG. 6 illustrates the detector 70 for detecting a signal of the first deformation sensor 66A.

The first support plate 61A and the first deformation sensor 66A, and the second support plate 61B and the second deformation sensor 66B have an identical configuration. Additionally, the detector 70 for detecting a signal of the first deformation sensor 66A, and a detector for detecting a signal of the second deformation sensor 66B have an identical configuration.

Accordingly, in the following descriptions, the first support plate 61A, and the detector 70 for detecting a signal of the first deformation sensor 66A will be described in detail, and detailed descriptions about the second support plate 61B, and the detector for detecting a signal of the second deformation sensor 66B will be omitted.

As illustrated in FIG. 3 and FIG. 4, the first support plate 61A is a rectangular plate extending in the Z direction, and disposed so as to be parallel to a surface on the side of the Y(+) direction of the housing 50. The first support plate 61A is formed of an elastic member (e.g., resin), and has elasticity.

An end 62 on the side of the Z(+) direction of the first support plate 61A is fixed to the housing 50. An end 63 on the side of the Z(−) direction of the first support plate 61A is not fixed to the housing 50. Accordingly, the end 63, and a portion between the end 62 and the end 63 are elastically deformable in the Y direction.

Note that, the end 62 is an example of a "fixed portion", and is referred to as a fixed portion 62 below. The end 63, and the portion between the end 62 and the end 63 are an example of a "deforming portion", and is referred to as a deforming portion 64 below.

As described above, the first support plate 61A includes the fixed portion 62 fixed to the housing 50, and the deforming portion 64 elastically deformable in the Y direction with the fixed portion 62 being a supporting point. Further, the deforming portion 64 is mounted with the first deformation sensor 66A.

In other words, the first support plate 61A is a cantilever including the fixed portion 62 fixed to the housing 50, and the deforming portion 64 that elastically deforms due to vibration and that is mounted with the first deformation sensor 66A.

As illustrated in the diagram denoted by the sign F2 in FIG. 3, on the first support plate 61A, the deforming portion 64 elastically deforms in the Y direction. An elastically deformable portion of the first support plate 61A (the deforming portion 64) is mounted with the first deformation sensor 66A.

Additionally, the second support plate 61B (see FIG. 4) is disposed so as to be parallel to the surface on the side of the X(+) direction of the housing 50, and deforms in the X direction. An elastically deformable portion of the second support plate 61B is mounted with the second deformation sensor 66B.

In this way, the reduction drive 5 includes two support plates 61 (first support plate 61A, second support plate 61B), and two deformation sensors 66 (first deformation sensor 66A, second deformation sensor 66B) individually mounted on the elastically deformable portions of the two support plates 61.

The motor 6 includes a rotor (not illustrated), a stator (not illustrated) that forms a magnetic field for the rotor to rotate, the motor side output shaft 16 (a rotary shaft of the rotor) extending in the Z direction, and a bearing 80 rotatably supporting the motor side output shaft 16 (see FIG. 5).

As illustrated in FIG. 5, the bearing 80 includes an outer ring 81, an inner ring 82, rolling elements 83, and a retainer (not illustrated). The outer ring 81 is fixed to the housing 50, and the inner ring 82 is fixed to the motor side output shaft 16. The rolling elements 83 are disposed between the outer ring 81 and the inner ring 82, and are retained by the retainer (not illustrated) so as not to contact with each other. The rolling elements 83 revolve, while maintaining constant intervals, and rolling between the outer ring 81 and the inner ring 82.

As a result, when the motor side output shaft 16 is rotating, the inner ring 82 rotates together with the motor side output shaft 16, the rolling elements 83 revolve while rolling between the outer ring 81 and the inner ring 82, and the outer ring 81 fixed to the housing 50 supports the inner ring 82 via the rolling elements 83. According to the above configuration, the bearing 80 can support the rotating motor side output shaft 16.

A load applied to the bearing 80, for example, a load acting from the motor side output shaft 16 on the inner ring 82 is supported by a contact surface between the outer ring 81 and the rolling elements 83 and a contact surface between the inner ring 82 and the rolling elements 83. Further, respective portions of the outer ring 81 and the inner ring 82 contacting the rolling elements 83 form orbital surfaces, and respective portions of the rolling elements 83 contacting the outer ring 81 and the inner ring 82 form rolling surfaces. The rolling elements 83 revolve while rolling between the outer ring 81 and the inner ring 82, and thus the respective orbital surfaces of the outer ring 81 and the inner ring 82, and the respective rolling surfaces of the rolling elements 83 serve as sliding surfaces.

As described above, the bearing 80 has the sliding surfaces, and supports the motor side output shaft 16 while sliding, and thus abrasion and vibration due to the sliding occur. Further, the bearing 80 supports the motor side output shaft 16 such that the motor side output shaft 16 is disposed along the Z direction, and thus when the bearing 80 vibrates due to the sliding, the motor side output shaft 16 vibrates in a direction intersecting with the Z direction (e.g., the X direction, the Y direction). Further, the housing 50, in synchronization with the vibration of the motor side output shaft 16, also vibrates in the direction intersecting with the Z direction.

In the reduction drive 5, since the toothed gear 54 mounted on the motor side output shaft 16 engages with the lower side toothed gear 55A, and the toothed gear 56 mounted on the reduction drive side output shaft 51 engages with the upper side toothed gear 55B, in the toothed gears 54, 55A, 55b, and 56, abrasion and vibration occur. Additionally, a bearing (not illustrated) rotatably supporting the toothed gears 55A and 55B (two-stage toothed gear 55) is also worn and vibrates, due to sliding.

The toothed gears 54, 55A, 55B, and 56, and the bearing supporting the toothed gears 55A and 55B vibrate in various directions including the X direction, the Y direction, and the Z direction.

Although details will be described later, in the present exemplary embodiment, by observing a vibration state of the motor unit 4, time when the motor unit 4 may fail, and time when a service lifetime of the motor unit 4 may end are predicted.

On the other hand, rotation of the motor side output shaft 16 is decelerated by the toothed gears 54, 55A, 55B, and 56, and transmitted to the reduction drive side output shaft 51, and thus a rotational speed of the motor side output shaft 16 is made the highest. Accordingly, the bearing 80 in which the inner ring 82 rotates most quickly together with the motor side output shaft 16 is likely to deteriorate earlier than other members. Further, when the bearing 80 deteriorates due to abrasion, vibration of the motor side output shaft 16 increases, and thus by observing a vibration state of the motor side output shaft 16, a deterioration state of the bearing 80 can be grasped.

Additionally, the failure of the motor unit 4 or the service lifetime of the motor unit 4 is susceptible to the bearing 80 most likely to deteriorate, and thus observing the deterioration state of the bearing 80 most likely to deteriorate facilitates prediction of the time when the motor unit 4 may fail and the time when the service lifetime of the motor unit 4 may end, compared to a case of observing deterioration states of other members.

In the present exemplary embodiment, the support plate 61 is made to vibrate easily in synchronization with vibration due to deterioration of the bearing 80. Specifically, the first support plate 61A is elastically deformable in the Y direction, and is made to vibrate easily in the Y direction. The second support plate 61B is elastically deformable in the X direction, and is made to vibrate easily in the X direction.

The first deformation sensor 66A is mounted on a portion that elastically deforms in the Y direction of the first support plate 61A, and is made to easily detect vibration due to the deterioration of the bearing 80 in the direction intersecting with the Z direction (vibration in the Y direction). The second deformation sensor 66B is mounted on a portion that elastically deforms in the X direction of the second support plate 61B, and is made to easily detect vibration due to the deterioration of the bearing 80 in the direction intersecting with the Z direction (vibration in the X direction).

In this way, in the present exemplary embodiment, since each of the deformation sensors 66 (first deformation sensor 66A, second deformation sensor 66B) is mounted on the support plate 61 that vibrates in the direction intersecting with the Z direction (X direction, Y direction), by observing the vibration due to the deterioration of the bearing 80 most likely to deteriorate (vibration in the direction intersecting with the Z direction), the deterioration state of the bearing 80 most likely to deteriorate is easily observed.

It is sufficient that the deformation sensor 66 is mounted on the support plate 61 that vibrates in the direction intersecting with the Z direction, and for example, a configuration may be adopted in which the deformation sensor 66 is mounted on the support plate 61 that vibrates in a direction intersecting with the X direction and the Y direction when viewed from the Z direction.

Further, the number of the support plates 61 may be two as described above (the first support plate 61A, the second support plate 61B), may be smaller than two, or may be larger than two. For example, the reduction drive 5 may be configured to include a single support plate 61 configured with the support plate 61 that vibrates in the direction intersecting with the X direction and the Y direction when viewed from the Z direction. The reduction drive 5 may be configured to include three support plates 61 including the first support plate 61A that vibrates in the Y direction, the second support plate 61B that vibrates in the X direction, and the support plate 61 that vibrates in the direction intersecting with the X direction and the Y direction when viewed from the Z direction.

As illustrated in FIG. 6, the first deformation sensor 66A includes a rectangular main body 67, and a wiring section 68.

The main body 67 is formed of an insulating material, for example, a polyimide resin, and has flexibility. An insulating material suffices as a constituent material of the main body 67, and a phenol resin or an epoxy resin is usable, other than the polyimide resin.

The wiring section 68 is bonded to the main body 67 with an adhesive, and deforms together with the main body 67, and a resistance value varies according to the deformation. The wiring section 68 is formed of, for example, a metallic thin film of a Cu—Ni alloy, a metallic thin film of an Ni—Cr alloy, or the like, and has a repeatedly folded meander shape. Note that, it is sufficient that the wiring section 68 is formed of a material in which a resistance value varies due to deformation, and for example, the wiring section 68 may be formed of a conductive resin, or the wiring section 68 may be formed of other metallic materials.

In this way, the first deformation sensor 66A is a resistor having a predetermined resistance value, and when the main body 67 deforms, the resistance value of the wiring section 68 varies. In other words, the first deformation sensor 66A is a load cell (strain gauge type load cell) in which resistance varies due to deformation. As a result, by observing the resistance value of the first deformation sensor 66A, a vibration state of the first support plate 61A can be grasped.

The detector 70 includes a Wheatstone bridge circuit 71 and an amplifier unit 72, and outputs the resistance value of the first deformation sensor 66A as a detection voltage.

The Wheatstone bridge circuit 71 is configured with three resistors R1, R2 and R3, and the first deformation sensor 66A. The Wheatstone bridge circuit 71 includes, between a supply terminal of a power supply voltage Vs and ground, a series circuit configured with the first deformation sensor 66A and the resistor R1, and a series circuit configured with the resistor R2 and the resistor R3. A voltage between a connection point C1 between the first deformation sensor 66A and the resistor R1, and a connection point C2 between the resistor R2 and the resistor R3 is inputted to the amplifier unit 72 as a detection voltage. The amplifier unit 72 amplifies the detection voltage and outputs the amplified detection voltage to the control unit 27.

The detection voltage is proportional to the resistance value of the first deformation sensor 66A.

For example, when the first support plate 61A vibrates at a cycle B, the resistance value of the first deformation sensor 66A also varies at the cycle B, and a detection voltage outputted from the detector 70 also varies at the cycle B. Accordingly, by observing a variation state of the detection voltage outputted from the detector 70, a variation state of the resistance value of the first deformation sensor 66A can be grasped, a vibration state of the first support plate 61A can be grasped, and the vibration state of the motor unit 4 can be grasped.

The control unit 27, based on the detection voltage from the detector 70, observes the variation state of the resistance value of the first deformation sensor 66A, and observes the vibration state of the motor unit 4.

After using the motor unit 4 for a long time, abrasion due to sliding occurs in the bearing 80, and for example, the orbital surface of the outer ring 81, the orbital surface of the inner ring 82, and the rolling surfaces of the rolling elements 83 are worn. Then, in a plane of revolution on which the rolling element 83 revolves, a location of the rolling element 83 begins to change.

For example, when the abrasion is minor, the rolling element 83 revolves on the plane of revolution, vibration of the motor side output shaft 16 is small, vibration of the housing 50 in the direction intersecting with the Z direction is small, and vibration of the support plate 61 is small.

For example, when the abrasion is significant, the rolling element 83 revolves while waving with respect to the plane of revolution, the vibration of the motor side output shaft 16 increases, the vibration of the housing 50 in the direction intersecting with the Z direction increases, and the vibration of the support plate 61 increases.

Further, when the toothed gears 54, 55A, 55B and 56, and the bearing supporting the toothed gears 55A and 55B are worn, the vibration of each of the toothed gears 54, 55A, 55B, and 56, and the bearing supporting the toothed gears 55A and 55B increases, and the vibration of the support plate 61 increases.

Thus, when the vibration of the motor unit 4 increases, it is possible to determine that deterioration of members constituting the motor unit 4 is in progress. Further, based on intensity of the vibration of the motor unit 4 (a height of amplitude), it is possible to determine a progress state of the deterioration of the members constituting the motor unit 4.

In the motor unit 4, when the members constituting the motor unit 4 (the bearing 80, the toothed gears 54, 55A, 55B, and 56, the bearing supporting the toothed gears 55A and 55B, and the like) deteriorate due to abrasion, the vibration of the support plate 61 increases, and a detection voltage begins to vary largely.

The control unit 27 observes the variation state of the detection voltage outputted from the detector 70, and observes the progress state of the deterioration of the members constituting the motor unit 4. Additionally, when the detection voltage begins to vary largely, the control unit 27 determines that there is a possibility that a problem may occur in the members constituting the motor unit 4, and predicts the time when the motor unit 4 may fail, and the time when the service lifetime of the motor unit 4 may end.

In the present exemplary embodiment, a variation amount of the detection voltage, based on which the time when the motor unit 4 may fail is determined to be getting near, is registered with a storage unit of the control unit 27, as a warning value. Further, a variation amount of the detection voltage, based on which it is determined that the motor unit 4 has failed, is registered with the storage unit of the control unit 27, as a use limit value. Additionally, a cumulated value of operating time (hereinafter, referred to as cumulated operating time), based on which the time when the service lifetime of the motor unit 4 may end is determined to be getting near, is registered with the storage unit of the control unit 27, as standard cumulated time.

The warning value and the use limit value and the standard cumulated time registered with the storage unit of the control unit 27 are acquired in prior evaluation in which the motor unit 4 is actually operated.

Further, the warning value, the use limit value, and the standard cumulated time registered with the storage unit of the control unit 27 are rewritable. For example, in the evaluation when the motor unit 4 is actually operated, when the warning value, the use limit value, and the standard cumulated time need to be changed, an operator changes the warning value, the use limit value, and the standard cumulated time registered with the storage unit of the control unit 27, via the display unit 17.

The control unit 27 observes both the cumulated operating time and the variation amount of the detection voltage of the motor unit 4, and when the cumulated operating time of the motor unit 4 is shorter than the standard cumulated time, and the variation amount of the detection voltage exceeds the warning value, the control unit 27 determines (predicts) that the time when the motor unit 4 may fail is getting near. Further, the control unit 27 notifies the operator that the time when the motor unit 4 may fail is getting near via the display unit 17, and prompts the operator to inspect or maintain (or repair) the motor unit 4.

As a result, since the control unit 27 predicts failure time of the motor unit 4, preventive maintenance for preventing failure of the motor unit 4 is enabled, and productivity of the printing apparatus 10 can be enhanced.

The control unit 27 observes both the cumulated operating time and the variation amount of the detection voltage of the motor unit 4, and when the cumulated operating time of the motor unit 4 is shorter than the standard cumulated time, and the variation amount of the detection voltage exceeds the use limit value, the control unit 27 determines that the motor unit 4 has failed, forcibly stops the printing apparatus 10, notifies the operator of the failure of the motor unit 4 via the display unit 17, and prompts the operator to repair the motor unit 4.

As a result, since the control unit 27 grasps the failure of the motor unit 4, a possibility can be prevented that the motor unit 4 is used in an abnormal state, and the printing apparatus 10 produces a large amount of abnormal printings.

The control unit 27 observes both the cumulated operating time and the variation amount of the detection voltage of the motor unit 4, and when the cumulated operating time of the motor unit 4 is equal to or larger than the standard cumulated time, and the variation amount of the detection voltage exceeds the warning value, the control unit 27 determines (predicts) that the time when the service lifetime of the motor unit 4 may end is getting near. Further, the control unit 27 notifies the operator that the time when the service lifetime of the motor unit 4 may end is getting near via the display unit 17, and prompts the operator to replace the motor unit 4 with a new motor unit 4.

As a result, since the control unit 27 predicts the time when the service lifetime of the motor unit 4 may end, the operator grasps time to replace the motor unit 4 with a new motor unit 4, and even if a new motor unit 4 is not kept in stock, the operator can arrange a new motor unit 4, and replacement with a new motor unit 4 is enabled in advance. Thus, a possibility that the printing apparatus 10 suddenly becomes unusable can be prevented. Further, in a case in which a new motor unit 4 is not kept in stock, while a new motor unit 4 is arranged, a possibility that the printing apparatus 10 is unable to produce printings can be prevented.

The control unit 27 observes both the cumulated operating time and the variation amount of the detection voltage of the motor unit 4, and when the cumulated operating time of the motor unit 4 is equal to or larger than the standard cumulated time, and the variation amount of the detection voltage exceeds the use limit value, the control unit 27 determines that the service lifetime of the motor unit 4 has ended, forcibly stops the printing apparatus 10, notifies the operator of the end of the service lifetime of the motor unit 4 via the display unit 17, and prompts the operator to replace the motor unit 4 with a new motor unit 4.

As a result, since the control unit 27 grasps the end of the service lifetime of the motor unit 4, a possibility can be prevented that the motor unit 4 is used in an abnormal state, and the printing apparatus 10 produces a large amount of abnormal printings.

In the present exemplary embodiment, since among the members constituting the motor unit 4, the bearing 80 is likely to deteriorate earliest, the support plate 61 and the deformation sensor 66 are disposed such that vibration occurring due to the deterioration of the bearing 80 (vibration in the direction intersecting with the Z direction) is easily detected.

Since the vibration in the direction intersecting with the Z direction also occurs due to deterioration of members other than the bearing 80, the control unit 27 observes both the deterioration state of the bearing 80 and deterioration states of the members other than the bearing 80, to predict the failure or the service lifetime of the motor unit 4. When the control unit 27 predicts the failure or the service lifetime of the motor unit 4, the operator performs repair or replacement of the motor unit 4, and prevents the motor unit 4 from being unable to operate.

In the motor unit 4, a cycle of vibration occurring due to engagement between the toothed gear 54 and the lower side toothed gear 55A is different from a cycle of vibration occurring due to engagement between the toothed gear 56 and the upper side toothed gear 55B. Specifically, since rotational speed of the toothed gear 54 mounted on the motor side output shaft 16 is higher than rotational speed of the toothed gear 56 mounted on the reduction drive side output shaft 51, the cycle of the vibration occurring due to the engagement between the toothed gear 54 and the lower side toothed gear 55A is shorter than the cycle of the vibration occurring due to the engagement between the toothed gear 56 and the upper side toothed gear 55B.

Accordingly, among waveforms of detection voltages, by observing a detection voltage varying at a short cycle, a variation state of a portion on which the toothed gear 54 and the lower side toothed gear 55A engages with each other can be grasped. Further, among waveforms of detection voltages, by observing a detection voltage varying at a long cycle, a variation state of a portion on which the toothed gear 56 and the upper side toothed gear 55B engages with each other can be grasped.

As described above, the cycles of vibration due to the members constituting the motor unit 4 are varied, and by observing a detection voltage corresponding to vibration due to a targeted member, a progress state of deterioration of the targeted member can be appropriately grasped. Thus, by observing a detection voltage corresponding to vibration due to the bearing 80 likely to deteriorate earliest, a progress state of deterioration of the bearing 80 can be appropriately grasped, and the time when the motor unit 4 may fail, and the service lifetime of the motor unit 4 can be appropriately predicted.

As described above, the motor unit 4 according to the present exemplary embodiment includes the motor 6 including the motor side output shaft 16 extending in the Z direction, and the reduction drive 5, in which the reduction drive 5 includes the housing 50, the reduction drive side output shaft 51, the toothed gear group 53 configured to decelerate rotation of the motor side output shaft 16 and transmit the rotation to the reduction drive side output shaft 51, and the deformation sensor 66 configured to detect deformation occurring due to vibration of the motor 6.

With the above configuration, the time when the motor unit 4 may fail can be predicted, and the preventive maintenance for preventing failure of the motor unit 4 can be performed. Further, the time when the service lifetime of the motor unit 4 may end can be predicted, and schedule maintenance for replacing the motor unit 4 before the service lifetime of the motor unit 4 ends can be appropriately performed. Thus, stopping of the printing apparatus 10 due to the motor unit 4 unable to operate can be prevented, and productivity of the printing apparatus 10 can be enhanced.

Exemplary Embodiment 2

Figure 7:
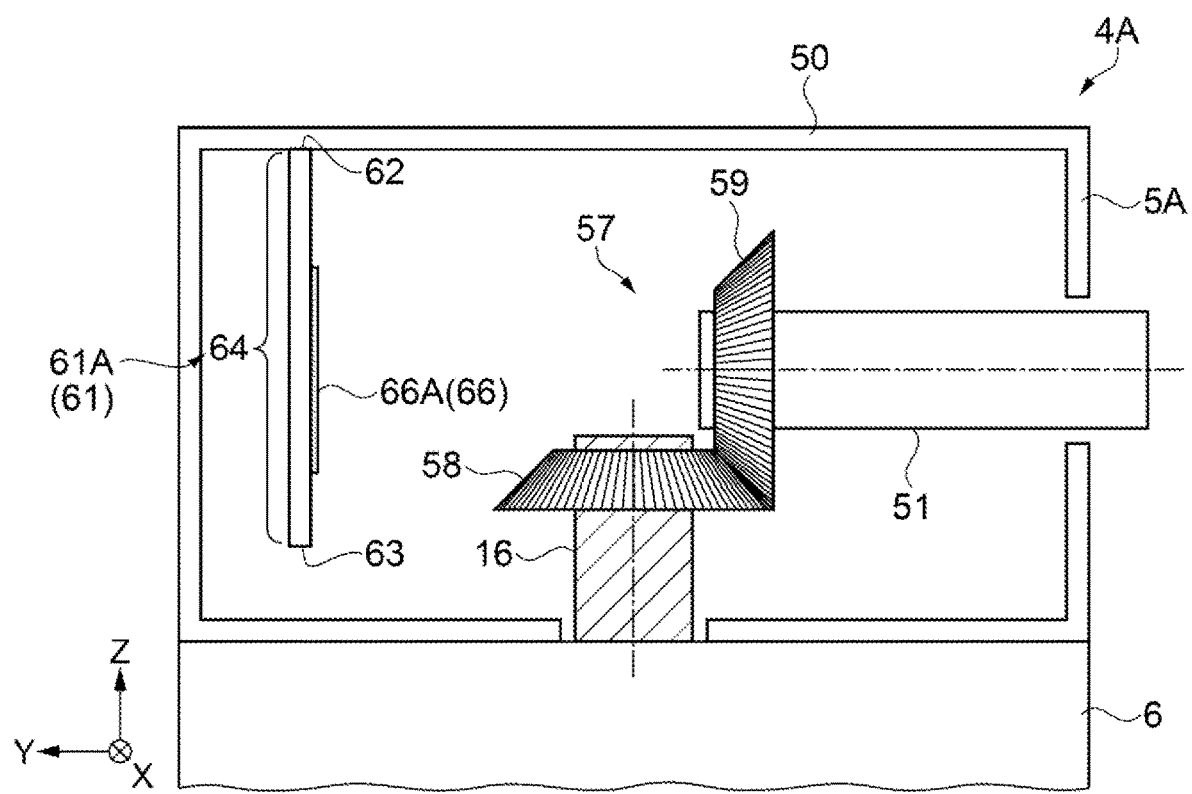
FIG. 7 is a schematic cross-sectional view of a reduction drive in a motor unit to be mounted on a printing apparatus according to Exemplary Embodiment 2.

FIG. 7 is a diagram corresponding to FIG. 3, and is a schematic cross-sectional view of a reduction drive in a motor unit to be mounted on a printing apparatus according to Exemplary Embodiment 2.

The present exemplary embodiment differs from Exemplary Embodiment 1 in a configuration of a toothed gear group, and in an extension direction of the reduction drive side output shaft 51. These are main differences between the present exemplary embodiment and Exemplary Embodiment 1.

With reference to FIG. 7, an overview of a printing apparatus according to the present exemplary embodiment will be described below by focusing on the differences from Exemplary Embodiment 1. Moreover, the same constituent elements as the constituent elements in Exemplary Embodiment 1 are denoted by the same reference signs, and descriptions of such constituent elements will be omitted.

As illustrated in FIG. 7, a reduction drive 5A in a motor unit 4A according to the present exemplary embodiment includes the housing 50, the reduction drive side output shaft 51 extending in the Y(−) direction, a toothed gear group 57 configured to decelerate rotation of the motor side output shaft 16 and transmit the rotation to the reduction drive side output shaft 51, the support plate 61, the deformation sensor 66 mounted on the support plate 61, and the detector 70. As described above, in the present exemplary embodiment, the reduction drive side output shaft 51 extends in the Y(−) direction. In Exemplary Embodiment 1, the reduction drive side output shaft 51 extends in the Z direction. This is a difference between the present exemplary embodiment and Exemplary Embodiment 1.

Additionally, the motor 6 includes the motor side output shaft 16 extending in the Z direction. The extension direction of the motor side output shaft 16 is identical both in the present exemplary embodiment and Exemplary Embodiment 1.

The toothed gear group 57 includes a toothed gear 58 mounted on the motor side output shaft 16, and a toothed gear 59 mounted on the reduction drive side output shaft 51. That is, in the present exemplary embodiment, the toothed gear group 57 includes two toothed gears 58 and 59. On the other hand, in Exemplary Embodiment 1, the toothed gear group 53 includes the four toothed gears 54, 55A, 55B and 56. This is a difference between the present exemplary embodiment and Exemplary Embodiment 1.

In the toothed gear group 57, a rotary shaft of the toothed gear 58 and a rotary shaft of the toothed gear 59 intersect with each other, and an angle formed by the rotary shaft of the toothed gear 58 and the rotary shaft of the toothed gear 59 is about 90 degrees. The number of teeth of the toothed gear 58 is smaller than the number of teeth of the toothed gear 59, and rotation of the motor side output shaft 16 is decelerated and transmitted to the reduction drive side output shaft 51, via the toothed gear 58 and the toothed gear 59.

Since the extension direction of the motor side output shaft 16 is identical both in the present exemplary embodiment and Exemplary Embodiment 1, the vibration occurring due to the deterioration of the bearing 80 (vibration in the direction intersecting with the Z direction) is identical both in the present exemplary embodiment and Exemplary Embodiment 1.

Accordingly, in the present exemplary embodiment, as in Exemplary Embodiment 1, the support plate 61 and the deformation sensor 66 are disposed to easily detect the vibration occurring due to the deterioration of the bearing 80 (vibration in the direction intersecting with the Z direction), the first support plate 61A is made to easily vibrate in the Y direction, and the second support plate 61B is made to easily vibrate in the X direction. Additionally, the first deformation sensor 66A is mounted on the first support plate 61A, and is made to easily detect the vibration due to the deterioration of the bearing 80 in the Y direction. The second deformation sensor 66B is mounted on the second support plate 61B, and is made to easily detect the vibration due to the deterioration of the bearing 80 in the X direction.

Accordingly, in the present exemplary embodiment, as in Exemplary Embodiment 1, the time when the motor unit 4 may fail can be predicted, and the preventive maintenance for preventing failure of the motor unit 4 can be performed. Further, the time when the service lifetime of the motor unit 4 may end can be predicted, and schedule maintenance for replacing the motor unit 4 before the service lifetime of the motor unit 4 ends can be appropriately performed. Thus, stopping of the printing apparatus 10 due to the motor unit 4 unable to operate can be prevented, and productivity of the printing apparatus 10 can be enhanced.

Exemplary Embodiment 3

Figure 8:
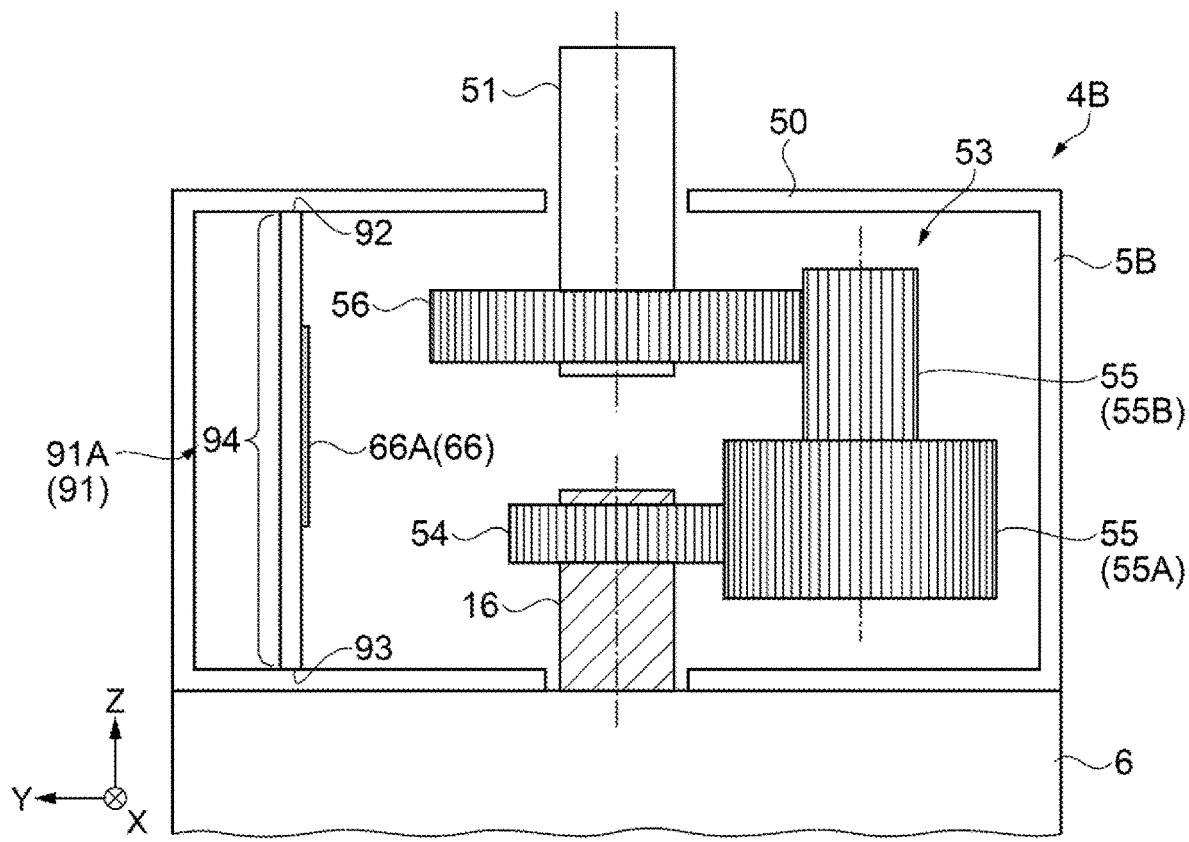
FIG. 8 is a schematic cross-sectional view of a reduction drive in a motor unit to be mounted on a printing apparatus according to Exemplary Embodiment 3.

FIG. 8 is a diagram corresponding to FIG. 3, and a schematic cross-sectional view of a reduction drive in a motor unit to be mounted on a printing apparatus according to Exemplary Embodiment 3.

The present exemplary embodiment differs from Exemplary Embodiment 1 in a state of a support plate as a constituent element of the reduction drive. A support plate 91 according to the present exemplary embodiment is a double fixed beam in which both ends 92 and 93 are fixed. The support plate 61 according to Exemplary Embodiment 1 is the cantilever in which the one end 62 is fixed, and the other end 63 is not fixed and is displaceable. This is the main difference between Exemplary Embodiment 3 and Exemplary Embodiment 1.

With reference to FIG. 8, an overview of a printing apparatus according to the present exemplary embodiment will be described below by focusing on the differences from Exemplary Embodiment 1. Moreover, the same constituent elements as the constituent elements in Exemplary Embodiment 1 are denoted by the same reference signs, and descriptions of such constituent elements will be omitted.

As illustrated in FIG. 8, a reduction drive 5B in a motor unit 4B according to the present exemplary embodiment includes the housing 50, the reduction drive side output shaft 51, the toothed gear group 53 configured to decelerate rotation of the motor side output shaft 16 and transmit the rotation to the reduction drive side output shaft 51, two support plates 91 (a first support plate 91A, a second support plate 91B), the two deformation sensors 66 (first deformation sensor 66A, second deformation sensor 66B) mounted on the support plates 91, and the detector 70.

On the first support plate 91A, each of an end 92 on the side of the Z(+) direction, and an end 93 on the side of the Z(−) direction is fixed to the housing 50. Further, on the first support plate 91A, a portion between the end 92 and the end 93 is elastically deformable in the Y direction.

Note that, the ends 92 and 93 are examples of a "fixed portion", and are referred to as fixed portions 92 and 93 below. Note that, the elastically deformable portion between the end 92 and the end 93 is an example of a "deforming portion", and is referred to as a deforming portion 94 below.

As described above, the first support plate 91A includes the fixed portions 92 and 93 fixed to the housing 50, and the deforming portion 94 elastically deformable in the Y direction with the fixed portions 92 and 93 being respective supporting points. Further, the deforming portion 94 is mounted with the first deformation sensor 66A. In other words, the first support plate 91A is a double fixed beam including the two fixed portions 92 and 93 fixed to the housing 50, and the deforming portion 94 that is disposed between the two fixed portions 92 and 93, that elastically deforms due to vibration, and that is mounted with the first deformation sensor 66A.

Although not illustrated, the second support plate 91B is a double fixed beam including an identical configuration to the first support plate 91A, and is elastically deformable in the X direction, and the second deformation sensor 66B is mounted on an elastically deformable portion of the second support plate 91B.

The support plate 91 according to the present exemplary embodiment is the double fixed beam in which both the ends 92 and 93 are fixed to the housing 50. On the other hand, the support plate 61 according to Exemplary Embodiment 1 is the cantilever in which the one end 62 is fixed to the housing 50.

Since the support plate 91 is the double fixed beam in which both the ends 92 and 93 are fixed to the housing 50, compared to the case of the support plate 61 being the cantilever in which the one end 62 is fixed to the housing 50, mechanical strength is enhanced, durability against impact is enhanced, and the support plate 91 is hardly broken even when strongly impacted. Accordingly, when the deformation sensor 66 is mounted on the support plate 91 being the double fixed beam, the deformation sensor 66 can stably detect vibration of the motor unit 4.

For example, in a case in which the printing apparatus 10 is transported, even when the motor unit 4 is strongly impacted and the motor unit 4 intensely vibrates, the support plate 91 being the double fixed beam is hardly broken. Additionally, the detector 70 can stably output a detection signal, and the control unit 27 can stably grasp deterioration states of the members constituting the motor unit 4, and stably predict the failure or the service lifetime of the motor unit 4.

On the other hand, since the support plate 61 is the cantilever in which the one end 62 is fixed to the housing 50, compared to the case of the double fixed beam in which both the ends 92 and 93 are fixed to the housing 50, the support plate 61 vibrates easily. Accordingly, when the deformation sensor 66 is mounted on the support plate 61 being the cantilever, the deformation sensor 66 detects vibration of the motor 6 more easily. Accordingly, the detector 70 can output a detection signal even when vibration is minor, and the control unit 27 can grasp change in the members constituting the motor unit 4 more sensitively.

The present disclosure is not limited to the above-described exemplary embodiments, but can be changed appropriately without departing from the idea or the gist of the present disclosure which can be appreciated from the claims and the entire specification, and a variety of modifications other than the above-described embodiments are conceivable. Hereinafter modifications will be described.

Modified Example 1

In the above described exemplary embodiment, the deformation sensor 66 is the load cell (strain gauge type load cell) in which the resistance varies according to the deformation. The deformation sensor 66 may be a piezoelectric element configured to generate a voltage due to deformation.

Further, the deformation sensor 66 may be a magnetostrictive load cell, a capacitance load cell, or a gyro load cell. Additionally, the deformation sensor 66 may be a piezoresistive semiconductor pressure sensor in which a resistance value varies when stress is applied to a substance.

Modified Example 2

In the above-described exemplary embodiment, the deformation sensor 66 is mounted on the support plate 61 in which the one end 62 is fixed to the housing 50, or mounted on the support plate 91 in which both the ends 92 and 93 are fixed to the housing 50. The deformation sensor 66 may be mounted on the housing 50. For example, the housing 50 may be formed of a material having elasticity such as resin or metal, and the deformation sensor 66 may be mounted on the housing 50. For example, a portion having rigidity and a portion having elasticity may be provided on the housing 50, and the deformation sensor 66 may be provided on an elastically deformable portion of the housing 50.

When the deformation sensor 66 is mounted on the housing 50, as in the case in which the deformation sensor 66 is mounted on the support plate 91 being the double fixed beam, durability against impact is enhanced, and the deformation sensor 66 can stably detect vibration of the motor 6. Further, since mounting the deformation sensor 66 on the housing 50, compared to the case in which the deformation sensor 66 is mounted on the support plates 61 or 91, makes the support plate 61 or 91 unnecessary, the configuration of the motor unit 4 is simplified, and cost of the motor unit 4 can be reduced.

Modified Example 3

As described above, the cycles of vibration due to the members constituting the motor unit 4 are varied. Accordingly, by observing a detection voltage corresponding to vibration due to a targeted member, a progress state of the targeted member can be grasped precisely, compared to cases of observing detection voltages corresponding to other frequencies.

Thus, when the support plate 61 has a natural frequency at which the support plate 61 resonates with vibration due to the targeted member, the support plate 61 easily vibrates at a frequency of the vibration due to the targeted member. Thus, the detector 70 is made to easily output a detection voltage corresponding to the frequency of the vibration due to the targeted member, and the control unit 27 can appropriately grasp a deterioration state of the targeted member.

Thus, the support plate 61 may have the natural frequency that resonates with the vibration due to the targeted member.

For example, since the natural frequency of the support plate 61 varies according to length of the support plate 61, the length of the support plate 61 may be adjusted such that the resonance with the vibration due to the targeted member easily occurs. For example, since the natural frequency of the support plate 61 varies according to rigidity of the support plate 61, the support plate 61 may be formed of a material having rigidity such that the resonance with the vibration due to the targeted member easily occurs. That is, a shape or a constituent material of the support plate 61 may be adjusted such that the support plate 61 resonates with the vibration due to the targeted member.

Further, when the deformation sensor 66 is mounted on the housing 50, as in the case in which the deformation sensor 66 is mounted on the support plate 61 or 91, the housing 50 may have a natural frequency that resonates with vibration due to a targeted member. For example, in order for the housing 50 to have a natural frequency that resonates with the vibration due to the targeted member, a shape may be devised, for example, a cutout is provided on the housing 50.

Modified Example 4

The support plate 61 and the deformation sensor 66 are not limited to be applied to the motor unit 4 of the printing unit 40, for example, may be applied to a motor unit of the transport unit 30, or may be applied to other members on which sliding occurs.

Further, the present application is not limited to be applied to members constituting the printing apparatus 10, and the present application may be applied to members constituting other electronic devices.

The contents derived from the exemplary embodiments described above will be described below.

A motor unit according to the present application is a motor unit including a motor including a motor side output shaft extending in a first direction, and a reduction drive, in which the reduction drive includes a housing, a reduction drive side output shaft, a toothed gear group configured to decelerate rotation of the motor side output shaft and transmit the rotation to the reduction drive side output shaft, and a deformation sensor configured to detect deformation occurring due to vibration of the motor.

When a sliding member (e.g., a bearing) deteriorates, in addition to occurrence of center runout or surface runout in or on an output shaft of the motor, the motor begins to vibrate. Accordingly, by observing a vibration state of the motor, a deterioration state of the sliding member can be observed. Since the motor unit according to the present application includes the deformation sensor configured to detect deformation occurring due to the vibration of the motor, the deformation sensor can observe the vibration state of the motor, and observe a state of the sliding member used for the motor unit.

Further, since the deformation sensor can be mounted on a portion in the reduction drive to which the vibration of the motor is transmitted, that is, an empty space of the reduction drive, a new space is not necessary, and space-saving of an apparatus including the motor unit is hardly hindered.

Further, when the vibration state of the motor is observed in the apparatus including the motor unit, the motor unit need not be removed from the apparatus, and in a state in which the motor unit is operating, the vibration state of the motor can be observed, and the deterioration state of the sliding member can be observed. Additionally, since as the deterioration of the sliding member advances, the vibration of the motor gradually increases, when the vibration of the motor is minor, the deterioration of the sliding member can be guessed to be minor, and when the vibration of the motor is significant, the deterioration of the sliding member can be guessed to be significant.

Further, by registering, magnitude of the vibration of the motor at time when the motor unit may fail, with the apparatus, the time when the motor unit may fail can be predicted, from magnitude of the vibration of the motor acquired by the deformation sensor, and magnitude of the vibration of the motor at the time that is registered with the apparatus and at which the motor unit may fail. Further, by registering, magnitude of the vibration of the motor at time when a service lifetime of the motor unit may end, with the apparatus, the time when the service lifetime of the motor unit may end can be predicted, from magnitude of the vibration of the motor acquired by the deformation sensor, and magnitude of the vibration of the motor at the time that is registered with the apparatus and at which the service lifetime of the motor unit may end.

In a motor unit according to the present application, the deformation sensor may be mounted on a support plate that elastically deforms in a direction intersecting with the first direction.

A sliding member supporting a motor side output shaft (e.g., bearing) rotates more quickly together with the motor side output shaft than other sliding members, and is likely to deteriorate earliest. Further, when the sliding member supporting the motor side output shaft deteriorates, the motor side output shaft begins to vibrate in the direction intersecting with the first direction. Accordingly, in order to observe a state of the member likely to deteriorate earliest, the deformation sensor may be mounted on a portion that vibrates in the direction intersecting with the first direction in a reduction drive.

Thus, the deformation sensor may be mounted on a support plate that elastically deforms in the direction intersecting with the first direction.

In a motor unit according to the present application, the support plate may be a cantilever including a fixed portion fixed to the housing, and a deforming portion that elastically deforms due to the vibration and that is mounted with the deformation sensor.

When the support plate is the cantilever in which one end is fixed to the housing, compared to a case of a double fixed beam in which both ends are fixed to the housing, the support plate is made to easily vibrate. Accordingly, when the deformation sensor is mounted on the support plate being the cantilever, the deformation sensor is made to easily detect vibration of a motor.

In a motor unit according to the present application, the support plate may be a double fixed beam including two fixed portions fixed to the housing, and a deforming portion that is disposed between the two fixed portions, that elastically deforms due to the vibration, and that is mounted with the deformation sensor.

When the support plate is the double fixed beam in which both ends are fixed to the housing, compared to a case of a cantilever in which one end is fixed to the housing, durability against impact is enhanced, and the support plate is hardly broken even when strongly impacted. Accordingly, when the deformation sensor is mounted on the support plate being the double fixed beam, the deformation sensor can stably detect vibration of the motor.

In a motor unit according to the present application, the deformation sensor may be mounted on the housing.

For example, when the housing is formed of a material having elasticity, and the deformation sensor is mounted on an elastically deformable portion of the housing, as in a case in which the deformation sensor is mounted on an elastically deformable portion of a support plate, the deformation sensor can observe a vibration state of a motor, and observe a deterioration state of a sliding member.

Further, when the deformation sensor is mounted on the housing, as in a case in which the deformation sensor is mounted on a support plate being a double fixed beam, durability against impact is enhanced, and the deformation sensor can stably detect vibration of a motor.

In a motor unit according to the present application, the deformation sensor may be a load cell in which resistance varies according to the deformation, or a piezoelectric element configured to generate a voltage according to the deformation.

When the deformation sensor is a load cell in which resistance varies due to deformation, according to variation in a resistance value, a vibration state of a motor can be observed, and a deterioration state of a sliding member can be observed. When the deformation sensor is a piezoelectric element that generates a voltage due to deformation, according to variation in a voltage outputted from the piezoelectric element, a vibration state of a motor can be observed, and a deterioration state of a sliding member can be observed.

A printing apparatus according to the present application includes the above motor unit.

A motor unit according to the present application, by a deformation sensor, can observe a vibration state of a motor, and can observe a deterioration state of a sliding member.

Further, time when the motor unit may fail can be predicted, from magnitude of vibration of the motor acquired by the deformation sensor, and magnitude of vibration of the motor at the time when the motor unit may fail acquired in prior evaluation. Further, time when a service lifetime of the motor unit may end can be predicted, from magnitude of the vibration of the motor acquired by the deformation sensor, and magnitude of the vibration of the motor at the time when the service lifetime of the motor unit may end acquired in the prior evaluation.

Thus, as for a printing apparatus including the motor unit according to the present application, based on a result of the prediction, before the motor unit becomes unable to operate due to failure or the end of the service lifetime, the motor unit can be replaced with a new motor unit, or the motor unit for which failure or the end of the service lifetime is predicted can be repaired or inspected. Additionally, stopping of the printing apparatus due to the motor unit being unable to operate can be prevented, and productivity of the printing apparatus can be enhanced.

What is claimed is:

1. A motor unit, comprising:
a motor including a motor side output shaft extending in a first direction; and
a reduction drive, wherein
the reduction drive includes
a housing coupled to the motor, the housing including screw holes,
a reduction drive side output shaft,
a toothed gear group configured to transmit rotation of the motor side output shaft to the reduction drive side output shaft with the rotation being decelerated,
a support plate extending in the first direction and configured to vibrate in a second direction that intersects the first direction, causing the support plate to deform, and
a deformation sensor coupled to the support plate and configured to detect deformation of the support plate occurring due to vibration of the motor.

2. The motor unit according to claim 1, wherein
the support plate is a cantilever including
a fixed portion fixed to the housing and
a deforming portion that elastically deforms due to the vibration and that is mounted with the deformation sensor.

3. The motor unit according to claim 1, wherein
the support plate is a double fixed beam including
two fixed portions fixed to the housing and
a deforming portion that is disposed between the two fixed portions, that elastically deforms due to the vibration, and that is mounted with the deformation sensor.

4. The motor unit according to claim 1, wherein
the deformation sensor is mounted on the housing.

5. The motor unit according to claim 1, wherein
the deformation sensor is a load cell in which resistance varies according to the deformation, or a piezoelectric element configured to generate a voltage according to the deformation.

6. A printing apparatus, comprising:
the motor unit according to claim 1.

* * * * *